United States Patent
Ohsaki et al.

(10) Patent No.: US 8,512,673 B2
(45) Date of Patent: Aug. 20, 2013

(54) MAGNESIUM OXIDE POWDER OF HIGH PURITY

(75) Inventors: Yoshihisa Ohsaki, Ako (JP); Atsuya Kawase, Ako (JP); Kaori Yamamoto, Ako (JP)

(73) Assignee: Tateho Chemical Industries Co., Ltd., Ako-shi, Hyogo (JP)

( * ) Notice: Subject to any disclaimer, the term of this patent is extended or adjusted under 35 U.S.C. 154(b) by 441 days.

(21) Appl. No.: 12/663,228

(22) PCT Filed: May 30, 2008

(86) PCT No.: PCT/JP2008/001367
§ 371 (c)(1),
(2), (4) Date: Jun. 9, 2010

(87) PCT Pub. No.: WO2008/149531
PCT Pub. Date: Dec. 11, 2008

(65) Prior Publication Data
US 2010/0266845 A1    Oct. 21, 2010

(30) Foreign Application Priority Data
Jun. 5, 2007    (JP) ................................. 2007-149168

(51) Int. Cl.
*C01F 5/02*    (2006.01)
*C01F 5/06*    (2006.01)

(52) U.S. Cl.
USPC ........... 423/635; 423/636; 423/637; 423/639; 428/402

(58) Field of Classification Search
USPC .................. 423/635, 637, 639, 636; 428/402
See application file for complete search history.

(56) References Cited

U.S. PATENT DOCUMENTS

| | | | |
|---|---|---|---|
| 1,664,630 A * | 4/1928 | Koehler | 423/163 |
| 3,365,316 A * | 1/1968 | Kingery et al. | 117/99 |
| 3,980,753 A * | 9/1976 | Grill et al. | 423/161 |
| 4,145,404 A * | 3/1979 | Miyata et al. | 423/635 |
| 4,298,379 A * | 11/1981 | Zambrano | 75/430 |
| 5,039,509 A * | 8/1991 | Miyata et al. | 423/636 |
| 5,476,642 A * | 12/1995 | Skubla et al. | 423/162 |
| 7,544,345 B2 * | 6/2009 | Toutsuka et al. | 423/635 |

FOREIGN PATENT DOCUMENTS

| | | |
|---|---|---|
| JP | 11-158558 A | 6/1999 |
| JP | 2003-002640 A | 1/2003 |
| JP | 2003-229132 A | 8/2003 |
| JP | 2007-022902 A | 2/2007 |

(Continued)

OTHER PUBLICATIONS

Ouraipryvan et al., Synthesis of crystalline MgO nanopartivcle with mesoporous-assembled structure via a surfctant-modified sol-gel process, Materials Lett. 63 (2009) 1862-1865.*

(Continued)

*Primary Examiner* — Hoa (Holly) Le
(74) *Attorney, Agent, or Firm* — Marshall, Gerstein & Borun LLP

(57) ABSTRACT

Magnesium oxide powders having a large diameter of crystallite, and having a favorable crystallinity are provided. Magnesium oxide powders: having peak widths at half-height of the peaks on a (111) plane, a (200) plane and a (220) plane of each no greater than 0.20 degrees as determined with a powder X-ray diffraction method carried out using a Cu—Kα ray; and having a crystallite diameter of no less than 700 Å.

4 Claims, 1 Drawing Sheet

(56) References Cited

FOREIGN PATENT DOCUMENTS

| JP | 2007-065245 A | 3/2007 |
|---|---|---|
| JP | 2007-070219 A | 3/2007 |
| JP | 2007-091525 A | 4/2007 |
| WO | WO-01/83848 A1 | 11/2001 |

OTHER PUBLICATIONS

Rhodes and Wuensch, Relation between precursor and microstructure in MgO, J. of the Am. Seram. Soc., 495-496, Sep. 1973.*

Natarajan et al., Thermal and particle size effects in magnesium oxide, Depart. of Chem., Indian Institute of Technology, Kanpur, India, 3088-3092 (1968).*

Alvarado et al., Preparation and characterization of MgO powders obtained from different magnesium salts and the mineral dolomite, Polyhedron 19 (2000) 2345-2351.*

Patterson, The Scherrer formula for X-Ray particle size determination, Physical Review, vol. 56 (1939) 978-982.*

Guilliatt and Brett, Lattice constant variations in finely divided magnesium oxide, Dept. of Ceramics with Refractories Technology, University of Sheffield (1969) 3328-3333.*

Wang, J.A. et al. "Characterizations of the thermal decomposition of brucite prepared by sol-gel technique for synthesis of nanocrystalline MgO", pp. 317-323, 3.1. X-ray diffraction analysis, Fig. 1., Materials Letters, Jun. 1998.

International Search Report for PCT/JP2008/001367, mailed Jul. 22, 2008.

* cited by examiner

MAGNESIUM OXIDE POWDER OF HIGH PURITY

TECHNICAL FIELD

The present invention relates to magnesium oxide powders having a favorable crystallinity.

BACKGROUND ART

Magnesium oxide (magnesia) has been utilized as refractory materials, and also as various additives, electronic component applications, phosphor source materials, source materials for various target substances, source materials for superconducting thin film substrates, tunnel barrier source materials for tunnel magnetic resistive elements (TMR elements), protective film source materials for color plasma display panels (PDPs), as well as source materials of crystal magnesium oxide layers for PDPs, and has attracted attention as an inorganic material having a very wide variety of applications. In recent years, magnesium oxide powders having a large crystallite diameter, an extremely small crystal strain and a favorable crystallinity, which can sufficiently exhibit a variety of characteristics of magnesium oxide such as insulating properties, fluorescent properties, transparency and the like in various applications have been demanded.

Known methods for producing magnesium oxide powders predominantly include: (1) a gas phase method by oxidation of metal magnesium; (2) a thermal decomposition method by baking a precursor such as magnesium hydroxide or magnesium carbonate at a temperature no lower than a thermal decomposition temperature; and (3) a method in which an agglomerate obtained by an electromelting method is pulverized.

However, according to such conventional methods, although magnesium oxide powders composed of single crystals having some level of size could be obtained, their size is not necessarily satisfactory, and magnesium oxide powders also having a favorable crystallinity cannot be produced.

As magnesium oxide powders having a favorable crystallinity, Patent Document 1 discloses magnesium oxide powders having a peak width at half-height (half-power band width) of the peak on a (200) plane in powder X-ray diffraction carried out using a Cu—Kα ray falling within the range of 0.40 to 0.60 degrees, and Patent Document 2 discloses magnesium oxide powders having a peak width at half-height of the X-ray diffraction peak at a Bragg angle (2θ±0.2 deg) of 42.9 deg (on a (200) plane) determined with a powder X-ray diffraction method carried out using a Cu—Kα ray falling within the range of 0.25 to 0.52 deg. However, these magnesium oxide powders do not yet have a sufficient level of crystallinity.

Patent Document 1: JP-A No. 2003-229132
Patent Document 2: JP-A No. 2007-065245

DISCLOSURE OF THE INVENTION

Problems to be Solved by the Invention

In view of the foregoing circumstances, an object of the present invention is to provide magnesium oxide powders having a large crystallite diameter, an extremely small crystal strain and a favorable crystallinity.

Means for Solving the Problems

The present inventors extensively investigated in order to solve the aforementioned problems, and consequently found that in producing magnesium oxide powders by baking a magnesium oxide precursor with a thermal decomposition method, magnesium oxide powders having a large crystallite diameter and a favorable crystallinity, which could not be any way obtained by a conventional process for production, can be produced by a method in which the baking is carried out in the presence of a certain amount of a halide ion, and in a closed system unlike common baking conditions. Accordingly, the present invention was accomplished.

More specifically, the present invention provides magnesium oxide powders: having peak widths at half-height of the peaks on a (111) plane, a (200) plane and a (220) plane of no greater than 0.20 degrees as determined with a powder X-ray diffraction method carried out using a Cu—Kα ray; and having a crystallite diameter of no less than 700 Å.

The magnesium oxide powders preferably have a purity of magnesium oxide being no less than 99.9% by mass, and are preferably composed of primary particles with a cubic shape having a smooth surface. Furthermore, it is preferred that a 50% cumulative particle size ($D_{50}$) determined with particle size distribution measurement by laser diffractive scattering is 0.1 to 10 μm.

The magnesium oxide powders of the present invention can be obtained by baking a magnesium oxide precursor in the presence of 0.3 to 30% by mass of a halide ion based on the total mass of the precursor in a closed system. Herein, the magnesium oxide precursor is preferably basic magnesium carbonate, magnesium hydroxide or a mixture thereof.

Effects of the Invention

According to the present invention, magnesium oxide powders having a large crystallite diameter and a favorable crystallinity can be obtained. Most suitably, magnesium oxide powders having a large crystallite diameter and a favorable crystallinity, being highly high pure, and composed of primary particles with a cubic shape having a smooth surface can be produced according to the present invention.

BEST MODE FOR CARRYING OUT THE INVENTION

The magnesium oxide powders of the present invention are favorable in its crystallinity, and the term "favorable crystallinity" herein means to have a very small crystal strain, accompanied by less lattice defects and the like in the crystal. Specifically, peak widths at half-height of the peaks on a (111) plane, a (200) plane and a (220) plane determined with a powder X-ray diffraction method carried out using a Cu—Kα ray are each no greater than 0.20 degrees, preferably no greater than 0.16 degrees, and more preferably no greater than 0.14 degrees. Although the lower limit of the peak width at half-height is not particularly limited, for example, it can be no less than 0.070 degrees, and further no less than 0.090 degrees.

Moreover, the magnesium oxide powders of the present invention have a large crystallite diameter. Crystalline powder particles are generally composed of fine crystals which can be regarded as a plurality of single crystals, and this fine crystal is referred to as a crystallite. A large crystallite diameter suggests that the particles are composed of large fine crystals (single crystals). Specifically, with a powder X-ray diffraction method carried out using a Cu—Kα ray, the crystallite diameter of magnesium oxide determined using a diffraction line on a (200) plane according to Scherrer's formula is no less than 700 Å, and preferably no less than 900 Å. It should be noted that taking into consideration the theoretical aspect of the aforementioned formula, the crystallite diameter beyond 1,000 Å cannot be specifically determined since such a value exceeding 1,000 Å is not reliable. Thus, such a range is designated also as ">1,000 Å" in Examples 1 and 3 in Table 1 below. However, the value of the crystallite diameter cannot be theoretically greater than the value of the particle size.

Since the magnesium oxide powders of the present invention have a favorable crystallinity, it is more preferred that the purity in terms of magnesium oxide is higher. Although magnesium oxide powders having a favorable crystallinity satisfactorily may not be obtained by merely achieving a high purity, a crystal strain may be caused when impurities are included in a large amount, in general, whereby the crystallinity tends to be inferior. Specific value of the purity is preferably no less than 99.9% by mass, and more preferably no less than 99.99% by mass.

The shape of the primary particles of the magnesium oxide powders can be identified with a scanning electron microscope, whereby the magnesium oxide powders of the present invention can be confirmed as being composed of primary particles with a cubic shape having a smooth surface. Herein, those in which cubic primary particles are each separated without aggregation to exhibit favorable dispersibility are preferred. It should be noted that the term "cubic shape" does not refer to a strict cubic shape in a geometrical sense, but to a shape which can be regarded as being approximately cubic by visual observation of a photomicrograph as shown in FIG. 1. However, the magnesium oxide powders of the present invention are not necessarily limited to those having a cubic shape.

Although the mean particle diameter is not particularly limited, the 50% cumulative particle size ($D_{50}$) determined with particle size distribution measurement by laser diffractive scattering preferably falls within the range of 0.1 to 10 μm. $D_{50}$ may be either no less than 1.0 μm, or less than 1.0 μm. The lower limit of the range of the value is more preferably no less than 0.3 μm, and still more preferably no less than 0.6 μm, while the upper limit thereof is more preferably no greater than 8 μm, and still more preferably no greater than 6 μm. The designation "$D_{50}$" refers to a median diameter, which is a particle size (μm) that corresponds to the point of 50% by volume in a cumulative graph with respect to the granularity, and means a particle size at a point that separates powders into two parts of equal amounts, i.e., one being a part including smaller powders than the particle size, and another being a part including larger powders than the particle size.

Next, a method for producing the magnesium oxide powders of the present invention will be explained.

The magnesium oxide powders of the present invention can be produced by a thermal decomposition method in which a precursor such as magnesium hydroxide or magnesium carbonate is baked at a temperature of no lower than the thermal decomposition temperature. Specifically, magnesium oxide powders can be produced by carrying out a step of baking a magnesium oxide precursor in the presence of 0.3 to 30% by mass of a halide ion based on the total mass of the precursor in a closed system. Accordingly, magnesium oxide powders having various properties as described above can be produced.

The magnesium oxide precursor is not particularly limited, and may be any precursor which can been used in conventional thermal decomposition methods, for example, magnesium hydroxide, basic magnesium carbonate, magnesium carbonate, magnesium oxalate, or the like. Among all, magnesium hydroxide, basic magnesium carbonate, and a mixture thereof are preferred since the resulting magnesium oxide powders are superior in properties described above.

When the precursor includes a large amount of impurities, magnesium oxide having a favorable crystallinity is less likely to be obtained; therefore, the content of impurities in the precursor is preferably as low as possible. With respect to specific amount of the impurities included in the precursor, total amount of the impurities remaining after generating magnesium oxide by a thermal decomposition method except for halide ions is preferably no greater than 0.1% by mass, and more preferably no greater than 0.01% by mass.

The baking is carried out in the presence of a halide ion. Examples of the halide ion include a chloride ion, a fluoride ion, a bromide ion and an iodide ion, and generally, a chloride ion may be used. Specific examples of the compound containing the halide ion include hydrochloric acid, ammonium chloride, sodium chloride, potassium chloride, magnesium chloride, and the like.

The amount of the halide ion which may be present is in the range of 0.3 to 30% by mass based on the total amount of the magnesium oxide precursor. When the amount of the halide ion is too small, it becomes difficult to achieve a favorable crystallinity and a large crystallite diameter. To the contrary, when the amount of the halide ion is too large, crystals of magnesium oxide are less likely to grow. The amount of the halide ion falls within the range of preferably 0.5 to 25% by mass, and more preferably 1.0 to 20% by mass.

The compound including a halide ion may be the magnesium oxide precursor of itself, a compound derived from impurities included in the magnesium oxide precursor, a by-product generated in preparing the magnesium oxide precursor with a solution synthesis method, a compound separately added to the magnesium oxide precursor, or a compound added in the form of, for example, a gaseous hydrogen chloride or the like to the gas atmosphere in a furnace of a closed system. Alternatively, after removing impurities included in the magnesium oxide precursor or by-products generated in preparing magnesium oxide sufficiently by washing or the like, the compound may be added freshly to the magnesium oxide precursor, or to the gas atmosphere.

As the aforementioned magnesium oxide precursor, a compound obtained by solution synthesis is preferred.

When the magnesium oxide precursor is a mixture of basic magnesium carbonate and magnesium hydroxide, in order to prepare the precursor by a solution synthesis method, for example, (1) an aqueous magnesium chloride solution is mixed with an aqueous sodium hydroxide solution to obtain a magnesium hydroxide slurry; (2) a part of magnesium hydroxide in the slurry is carbonated to obtain a slurry containing basic magnesium carbonate and magnesium hydroxide; and (3) the slurry is filtrated to obtain a mixture of basic magnesium carbonate and magnesium hydroxide. This mixture contains a chloride ion in the form of magnesium chloride that is a starting material, or of sodium chloride that is a by-product.

After the magnesium hydroxide slurry was obtained in the step (1) described above, the concentration of the slurry may be adjusted to fall within the range of preferably 50 to 100 g/L, and more preferably 60 to 90 g/L by diluting with water. This adjusting operation is carried out for allowing the carbonation reaction to proceed homogenously in the following step (2) by lowering the concentration of the slurry to reduce the viscosity of the slurry.

In the aforementioned step (2), a carbon dioxide gas is blown into the slurry, thereby carbonating a part of magnesium hydroxide in the slurry. The temperature of this carbonation reaction is preferably 40 to 80° C. In this temperature range, conversion from magnesium hydroxide to basic magnesium carbonate is rapidly permitted, whereby favorable reaction efficiency is achieved. Moreover, in this temperature range, a mixture of basic magnesium carbonate and magnesium hydroxide having a particle size to achieve excellent filtration efficiency can be obtained.

The amount of the carbon dioxide gas used in the carbonation reaction may be an amount enabling a part of magnesium hydroxide in the magnesium hydroxide slurry to convert into basic magnesium carbonate, thereby capable of providing a mixture of basic magnesium carbonate and magnesium hydroxide. Specific amount of the carbon dioxide gas used is preferably 0.2 to 2.0 molar equivalent based on 1 mol of magnesium hydroxide. When the amount of the carbon dioxide gas is in this range, a mixture of basic magnesium carbonate and magnesium hydroxide that is excellent in filtration efficiency can be obtained with favorable efficiency.

In the step (3), the slurry containing basic magnesium carbonate and magnesium hydroxide obtained in the step (2) is filtrated to obtain a mixture of basic magnesium carbonate and magnesium hydroxide in the form of a solid. Since this solid mixture contains a chloride ion, it may be directly dried without washing, and then may be subjected to the baking described later. Alternatively, this mixture may be washed with an appropriate quantity of water to reduce the amount of the chloride ion contained in the cake to an adequate level, and then may be subjected to drying and baking. When washing is carried out too sufficiently, the content of the chloride ion may be so low that the effect of the present invention may not be achieved. Therefore, it is necessary to regulate the extent of washing by the amount of washing water used, washing time, and the like. However, it is also acceptable to carry out washing sufficiently to completely remove the chloride ion, and thereafter a halide ion-containing compound may be added separately.

When the magnesium oxide precursor is magnesium hydroxide, in order to prepare the precursor by a solution synthesis method, for example, (1) an aqueous magnesium chloride solution is mixed with an aqueous sodium hydroxide solution to obtain a magnesium hydroxide slurry; and (2) the slurry is filtrated to obtain solid magnesium hydroxide. This solid contains a chloride ion in the form of magnesium chloride that is a starting material, or of sodium chloride that is a by-product.

After the magnesium hydroxide slurry was obtained in the step (1) described above, the concentration of the slurry may be adjusted to fall within the range of preferably 50 to 100 g/L, and more preferably 60 to 90 g/L by diluting with water, and the magnesium hydroxide particles in the slurry are preferably allowed to grow by aging. Accordingly, the filtration efficiency in the step (2) can be improved. The conditions for the aging are not particularly limited, and the slurry may be kept at a high temperature for a certain time period while stirring. The aging temperature may be, for example, 80 to 150° C., and the aging time period may be approximately from several minutes to several hours.

In the aforementioned step (2), the magnesium hydroxide slurry obtained in the step (1) is filtrated to obtain solid magnesium hydroxide. Since this solid contains a chloride ion, it may be subjected to the treatment as described above.

In the process for producing magnesium oxide of the present invention by the thermal decomposition method, baking of the magnesium oxide precursor is carried out in the presence of a halide ion, and in a closed system. The closed system according to the present invention refers to a system which is essentially sealed so as to substantially prevent the gas being present in the space where the baking is conducted from flowing outside, and also to substantially prevent a gas from flowing in from the outside. Hence, the present method is distinct from common baking methods carried out in the ambient air or under an atmosphere open to oxygen etc., or while allowing such a gas stream to flow. According to the present invention, the halide ion remains in the space in which the baking is conducted by baking in a closed system without dissipation of the halide ion outside, which intervenes during the process of growth of the crystals of the magnesium oxide powders, whereby slow growth of the crystals is enabled. Accordingly, magnesium oxide powders having a large crystallite diameter, an extremely small crystal strain and a favorable crystallinity, accompanied by fewer lattice defects can be obtained.

The baking in this closed system can be conducted by, for example, using a sealed furnace substantially free from out- and in-flow of the atmosphere gas, or after charging in a sealable crucible, etc. The temperature in baking may be 600° C. to 1,400° C., and most preferably approximately 1,200° C. When the temperature in baking is too high, the obtained crystals may aggregate to deteriorate the dispersibility. The baking time period may vary depending on the temperature, but it is usually about 1 to 10 hrs. For example, when the temperature is approximately 1,200° C., the time period is suitably about 5 hrs. Although the rate in elevating the temperature for the baking is not particularly limited, it may be 5 to 10° C./min.

The atmosphere in this baking is not particularly limited, and may include, for example, an ambient air, oxygen, nitrogen, argon or the like. Of these, an ambient air or an oxygen atmosphere is preferred which allows impurities included in the precursor to be removed as an oxidized gas.

By baking under the aforementioned conditions, magnesium oxide powders having a large crystallite diameter and a favorable crystallinity will grow; however, impurities such as the aforementioned halide ion-containing compound are not removed sufficiently, and may contaminate in powders following baking, since the baking is conducted under a sealed state. In order to reduce the amount of the contaminating halide ion-containing compound to elevate the purity of the magnesium oxide powders, it is preferred in the manufacturing method of the present invention, to further conduct secondary baking in an open system after primary baking in the closed system as described above.

This secondary baking may be common one conducted in an open system, and can be carried out in, for example, a gas furnace in which an atmosphere gas flows under an ambient air atmosphere, an electric furnace under an oxygen gas stream, or the like. The temperature, the time period, and the gas in the furnace employed in the secondary baking are not particularly limited as long as impurities such as a halide ion-containing compound can be removed, and the time period of the secondary baking may be relatively shorter since the crystal growth has already been completed by the primary baking.

EXAMPLES

Hereinafter, the present invention will be explained in more detail by way of Examples; however, the present invention is not limited to these Examples.

In the Examples below, various physical properties and the like were determined according to the procedures shown in the following.

(1) Powder X-ray Diffraction Method

Using an X-ray difractometer (trade name: RINT-Ultima III, manufactured by Rigaku Corporation), a sample of magnesium oxide powders was subjected to a measurement with a powder X-ray diffraction method using a Cu—Kα ray. Then, using an analysis software (trade name: Jade 6, manufactured by Rigaku Corporation), the peak around 2θ=36.9 deg was defined as a (111) plane, the peak around 2θ=42.9 deg was defined as a (200) plane, and the peak around 2θ=62.3 deg was defined as a (220) plane. Thus, the peak width at half-height of each peak was calculated. In addition, the crystallite diameter was determined using the diffraction line of the (200) plane, according to the Scherrer's formula.

(2) Method for Measuring Particle Size Distribution by Laser Diffractive Scattering Using a laser diffraction scattering particle size analyzer (trade name: HIRA, manufactured by Nikkiso Co., Ltd.), the 50% cumulative particle size ($D_{50}$) was measured.

(3) Method for Measuring Purity of Magnesium Oxide Powder

The purity of the magnesium oxide powders was calculated in terms of a value yielded by subtracting total mass of the measured impurities from 100% by mass.

(4) Method for Measuring Amount of Impurities of Magnesium Oxide Powders

The amount of impurities (Si, Al, Ca, Fe, V, Cr, Mn, Ni, Zn, B, Zr, Cu, Na, K and Cl) of the magnesium oxide powders was measured using an ICP light emitting analyzer (trade name: SPS-1700, manufactured by Seiko Instruments Inc.) after dissolving the sample in an acid.

(5) Method for Measuring Amount of Halide in Magnesium Oxide Precursor

The amount of halide in the magnesium oxide precursor was measured with an ICP emission spectrometer (trade name: SPS-1700, manufactured by Seiko Instruments Inc.).

Example 1

An aqueous magnesium chloride ($MgCl_2$) solution was allowed to react with an aqueous sodium hydroxide (NaOH) solution, whereby a magnesium hydroxide ($Mg(OH)_2$) slurry was obtained. This magnesium hydroxide slurry was diluted in ion exchanged water to give the slurry concentration of 75 g/L, and water vapor was blown into 30 L of the diluted magnesium hydroxide slurry being stirred at a rate of 100 to 150 rpm, and the liquid temperature was adjusted to 60° C. Next, a carbon dioxide gas having a $CO_2$ content of 100% by volume was blown from the bottom of the tank while keeping the liquid temperature at 60° C., at a flow rate of 10 L/min for 3 hrs (0.8 molar equivalent), whereby a part thereof was converted into basic magnesium carbonate.

Subsequently, this slurry was filtrated, and the resulting cake was washed with 25 L of ion exchanged water. Thereafter, the cake was dried at 120° C. for 10 hrs with a dryer to obtain a precursor. From the results of a X-ray diffraction analysis, it was revealed that the precursor was a mixture of magnesium hydroxide and basic magnesium carbonate (chemical formula: $4MgCO_3.Mg(OH)_2.8H_2O$ and $4MgCO_3.Mg(OH)_2.4H_2O$). The content of the chloride ion contained in the precursor which was measured in this stage was 0.8% by mass.

Next, the precursor that is a mixture of magnesium hydroxide and basic magnesium carbonate was baked by heating to 1,200° C. at a temperature elevation rate of 6° C./min in a closed electric furnace without out- and in-flow of the atmosphere gas in an ambient air atmosphere, and then keeping at the same temperature for 5 hrs, whereby magnesium oxide powders were formed. These were subjected to baking again at 1,200° C. in a gas furnace that permits out- and in-flow of the atmosphere gas in an ambient air atmosphere for 1 hour, and thus the magnesium oxide powders of the present invention were obtained.

Example 2

An aqueous magnesium chloride ($MgCl_2$) solution was allowed to react with an aqueous sodium hydroxide (NaOH) solution, whereby a magnesium hydroxide ($Mg(OH)_2$) slurry was obtained. This magnesium hydroxide slurry was diluted in ion exchanged water to give the slurry concentration of 75 g/L, and 30 L of the diluted magnesium hydroxide slurry was kept at a liquid temperature of 115° C. in an autoclave while stirring at a rate of 500 to 600 rpm, and a hydrothermal reaction was allowed for 1 hour. Subsequently, this slurry was filtrated, and the resulting cake was washed with 20 L of ion exchanged water. Thereafter, the cake was dried at 120° C. for 10 hrs with a dryer to obtain a precursor. The content of the chloride ion contained in the precursor which was measured in this stage was 5% by mass.

Next, the precursor was baked by heating to 1,200° C. at a temperature elevation rate of 6° C./min in a closed electric furnace without out- and in-flow of the atmosphere gas in an ambient air atmosphere and then keeping at the same temperature for 5 hrs, whereby magnesium oxide powders were yielded. These were subjected to baking again at 1,200° C. in a gas furnace that permits out- and in-flow of the atmosphere gas in an ambient air atmosphere for 1 hour, and thus the magnesium oxide powders of the present invention were obtained.

Example 3

A precursor that is a mixture of basic magnesium carbonate and magnesium hydroxide was obtained in a similar manner to Example 1 except that the amount of ion exchanged water used in the washing step was changed to 30 L, and 6 N hydrochloric acid which had been diluted to about 10 fold with ion exchanged water was added to the cake after washing with water and before drying. Then, the magnesium oxide powders of the present invention were obtained. An SEM compositional image (15,000 folds) of the obtained magnesium oxide powders was taken using a scanning electron microscope (trade name: JSM-5410, manufactured by JEOL), and the result is shown in FIG. 1. Almost all shapes of the observed crystals were approximately cubic, revealing extremely similar particle shapes. No fine particles were attached to the crystal surface, which crystal surface was smooth and clean. Furthermore, respective crystal grains were well separated.

Comparative Example 1

Magnesium oxide powders were obtained in a similar manner to Example 1 except that the baking was carried out in a gas furnace that permits out- and in-flow of the atmosphere gas in an ambient air atmosphere (i.e., the baking being carried out in an open system). The result of observation of the obtained magnesium oxide powders with a scanning electron microscope (15,000 fold) is shown in FIG. 2. The resulting magnesium oxide powders did not include crystals grown to have a cubic shape, having a small particle size, with each particle being aggregated.

Comparative Example 2

Commercially available highly pure magnesium oxide powders (manufactured by Iwatani Chemical Industry Co., Ltd., MJ-30) were provided for Comparative Example 2. The result of observation of the sample with a scanning electron microscope (15,000 fold) is shown in FIG. 3, revealing irregular fine particles aggregating to one another.

Comparative Example 3

Magnesium chloride ($MgCl_2$) (analytical values for each element of impurities: Si, Al, Fe, V, Cr, Mn, Ni, Zr, B and Zn each being no greater than 10 ppm, and Ca being no greater than 30 ppm) in an amount of 1.0 kg was dissolved in ion exchanged water (electric conductivity: no greater than 0.1 μS/cm) to give a solution of 3 liter ($MgCl_2$=about 3.5 mol/L). A continuous reaction was carried out by feeding liquids of the $MgCl_2$ solution and a NaOH solution (alkaline content: 20 to 50% by mass) to a reactor with a metering pump and a roller pump, respectively, such that the reaction rate of $MgCl_2$ became 20% by mole. The reaction slurry was allowed to overflow from the reactor at a residence time of 30 min, and 500 ppm of a coagulant was added to the produced magnesium hydroxide, whereby sedimentation was permitted, and the supernatant liquid (purified magnesium chloride solution) was recovered.

A magnesium hydroxide slurry was produced by charging a NaOH solution (alkaline content: 20 to 50% by mass) while stirring the purified magnesium chloride solution thus recovered such that the rate of the reaction of $MgCl_2$ became 90% by mole. The magnesium hydroxide slurry was filtrated, washed with water, and dried to obtain a precursor. The content of the chloride ion contained in the precursor which was measured in this stage was 0.1% by mass. Next, this precursor was baked in a gas furnace that permits out- and in-flow of the atmosphere gas in an ambient air atmosphere at 1,400° C. for 60 min to obtain highly pure magnesium oxide powders of Comparative Example 3.

With respect to Examples 1 to 3 and Comparative Examples 1 to 3, the measurement results with a powder X-ray diffraction method, the measurement results of the 50% cumulative particle size, and the measurement results of the purity of magnesium oxide are shown in Table 1.

TABLE 1

| | (111) peak width at half-height (°) | (200) peak width at half-height (°) | (220) peak width at half-height (°) | crystallite diameter (Å) | $D_{50}$ (μm) | Purity (% by mass) |
|---|---|---|---|---|---|---|
| Example 1 | 0.119 | 0.111 | 0.122 | >1,000 | 0.4 | >99.99 |
| Example 2 | 0.136 | 0.132 | 0.135 | 920 | 1.4 | >99.9 |
| Example 3 | 0.097 | 0.098 | 0.109 | >1,000 | 6.1 | >99.99 |
| Comparative Example 1 | 0.179 | 0.174 | 0.180 | 530 | 3.1 | >99.99 |
| Comparative Example 2 | 0.214 | 0.217 | 0.249 | 379 | 3.8 | >99.9 |
| Comparative Example 3 | 0.172 | 0.166 | 0.172 | 586 | 0.4 | >99.99 |

INDUSTRIAL APPLICABILITY

The magnesium oxide powders of the present invention are useful as additives, fillers and source materials for electronic components, phosphor source materials, pharmaceuticals, reagents for use in laboratories, source materials for various target substances, source materials for substrate films of superconducting thin-films, tunnel barrier source materials for TMR elements, protective film source materials for PDPs, crystal magnesium oxide layer source materials for PDPs, and the like.

Figure 1:
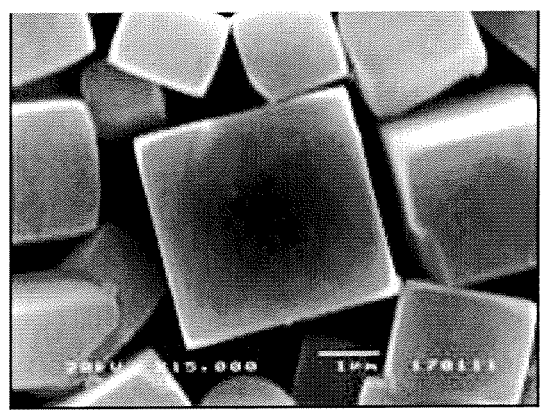
FIG. 1 shows a view of an electron micrograph illustrating magnesium oxide powders obtained in Example 3.
Figure 2:
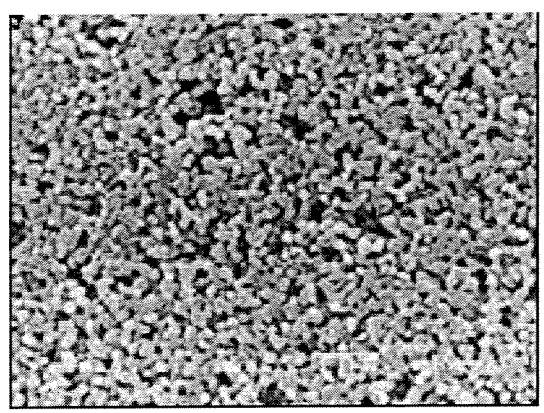
FIG. 2 shows a view of an electron micrograph illustrating magnesium oxide powders obtained in Comparative Example 1.
Figure 3:
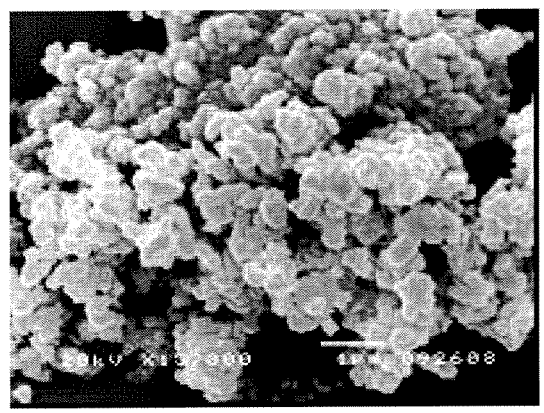
FIG. 3 shows a view of an electron micrograph illustrating magnesium oxide powders obtained in Comparative Example 2.

The invention claimed is:
1. Magnesium oxide powders: having peak widths at half-height of the peaks on a (111) plane, a (200) plane and a (220) plane of each no greater than 0.20 degrees as determined with a powder X-ray diffraction method carried out using a Cu—Kα ray; and having a crystallite diameter of no less than 700 Å,
wherein:
the purity of the magnesium oxide is no lower than 99.9% by mass, and the magnesium oxide powders comprise primary particles with a cubic shape having a smooth surface.

2. The magnesium oxide powders according to claim 1 wherein a 50% cumulative particle size ($D_{50}$) determined with particle size distribution measurement by laser diffractive scattering is 0.1 to 10 μm.

3. The magnesium oxide powders according to claim 1 which are obtained by a manufacturing method comprising baking a magnesium oxide precursor in the presence of 0.3 to 30% by mass of a halide ion based on the total mass of the precursor, in a closed system.

4. The magnesium oxide powders according to claim 3 wherein the magnesium oxide precursor is basic magnesium carbonate, magnesium hydroxide or a mixture thereof.

\* \* \* \* \*